(12) United States Patent
Kusumoto

(10) Patent No.: US 10,843,335 B2
(45) Date of Patent: Nov. 24, 2020

(54) ROBOT AND GEAR UNIT

(71) Applicant: Seiko Epson Corporation, Tokyo (JP)

(72) Inventor: Hiroyuki Kusumoto, Okaya (JP)

(73) Assignee: Seiko Epson Corporation

( * ) Notice: Subject to any disclaimer, the term of this patent is extended or adjusted under 35 U.S.C. 154(b) by 324 days.

(21) Appl. No.: 15/936,893

(22) Filed: Mar. 27, 2018

(65) Prior Publication Data

US 2018/0281177 A1 Oct. 4, 2018

(30) Foreign Application Priority Data

Mar. 30, 2017 (JP) ................. 2017-067192

(51) Int. Cl.
| | |
|---|---|
| *B25J 9/10* | (2006.01) |
| *F16H 49/00* | (2006.01) |
| *F16H 55/08* | (2006.01) |
| *F16H 57/04* | (2010.01) |
| *F16C 33/78* | (2006.01) |
| *F16C 27/06* | (2006.01) |
| *F16C 19/06* | (2006.01) |

(52) U.S. Cl.
CPC ........... *B25J 9/1025* (2013.01); *F16C 27/066* (2013.01); *F16C 33/7886* (2013.01); *F16H 49/001* (2013.01); *F16H 55/0833* (2013.01); *F16H 57/0401* (2013.01); *F16H 57/0445* (2013.01); *F16H 57/0454* (2013.01); *F16C 19/06* (2013.01); *F16C 2322/59* (2013.01); *F16C 2361/61* (2013.01)

(58) Field of Classification Search
CPC .... B25J 9/1025; F16H 49/001; F16H 57/0401
See application file for complete search history.

(56) References Cited

U.S. PATENT DOCUMENTS

| | | | |
|---|---|---|---|
| 2018/0080543 A1* | 3/2018 | Kusumoto | F16H 57/12 |
| 2019/0346034 A1* | 11/2019 | Noda | B25J 9/102 |
| 2019/0368594 A1* | 12/2019 | Sakata | F16H 49/001 |
| 2020/0072338 A1* | 3/2020 | Tezuka | F16C 33/103 |

FOREIGN PATENT DOCUMENTS

| | | | |
|---|---|---|---|
| JP | 09250609 A | * | 9/1997 |
| JP | 09-291985 A | | 11/1997 |

* cited by examiner

*Primary Examiner* — Terence Boes
(74) *Attorney, Agent, or Firm* — Harness, Dickey & Pierce, P.L.C.

(57) ABSTRACT

A robot includes a first member, a second member provided rotatably with respect to the first member, a gearing that transmits drive power from one side to the other side of the first member and the second member, the gearing includes an internal gear, an external gear having a flexible barrel portion in a tubular shape with an opening portion in an end part, and rotating about a rotation axis relative to the internal gear, and a wave generator, the wave generator includes a cam having a non-circular outer circumferential surface, and a bearing including an inner ring, an outer ring, and a plurality of balls, the first member includes a counter body provided to face the end part on the opening portion side of the barrel portion, and a first seal member is provided between the outer ring and the counter body.

16 Claims, 8 Drawing Sheets

ROBOT AND GEAR UNIT

BACKGROUND

1. Technical Field

The present invention relates to a robot and a gear unit.

2. Related Art

In a robot having a robot arm including at least one arm, for example, a joint part of the robot arm is driven by a motor and, generally, the drive power from the motor is reduced by a reducer. As the reducer, a gearing as described in Patent Document 1 (JP-A-9-291985) is known.

A gearing described in Patent Document 1 has a rigid internal gear, a flexible external gear provided inside of the gear, and a wave generator that flexes the flexible external gear in a radial direction to partially mesh with the rigid internal gear and moves the meshing position in a circumferential direction. Here, a disc-shaped end plate is provided to face the opening end on the side on which the external teeth of the flexible external gear are formed, and a distal end side of an annular elastic seal member attached to the opening end of the flexible external gear is in contact with the inner end surface of the end plate to partition the outer circumference side part and the inner circumference side part of the flexible external gear. Thereby, a flow of a lubricant between the inner space and the outer space of the flexible external gear can be blocked. Further, the wave generator of the gearing described in Patent Document 1 includes a rigid cam plate in an elliptical shape and a wave bearing fitted with the outer circumferential surface thereof.

In the gearing described in Patent Document 1, the outer ring of the wave bearing has an inner circumferential surface in contact with a plurality balls and an outer circumferential surface in frictional contact with the inner circumferential surface of the flexible external gear. The frictional contact conditions of these contact portions are largely different.

However, the configuration described in Patent Document 1 has a problem that a lubricant easily flows in between the inner space and the outer space of the outer ring of the wave bearing and improvement of lubrication performance of both of the above described two contact portions is difficult.

SUMMARY

An advantage of some aspects of the invention is to provide a robot and a gear unit that can give a gearing a longer life.

The invention can be implemented as the following application examples or embodiments.

A robot according to an application example includes a first member, a second member including an arm and provided rotatably with respect to the first member, a gearing that transmits drive power from one side to the other side of the first member and the second member, wherein the gearing includes an internal gear, an external gear provided with external teeth partially meshing with the internal gear, having a flexible barrel portion in a tubular shape with an opening portion in an end part, and rotating about a rotation axis relative to the internal gear, and a wave generator in contact with an inner circumferential surface of the external gear and moving a meshing position of the internal gear and the external gear in a circumferential direction around the rotation axis, the wave generator includes a cam having a non-circular outer circumferential surface, and a bearing provided between the inner circumferential surface of the external gear and the outer circumferential surface of the cam in contact with these surfaces and including an inner ring, an outer ring, and a plurality of balls, the first member includes a counter body provided to face the end part on the opening portion side of the barrel portion, and a first seal member is provided between the outer ring and the counter body.

According to the robot, the first seal member is provided between the outer ring and the counter body, and thereby, a flow of a lubricant from the inner circumference side (balls side) to the outer circumference side (external gear side) of the outer ring can be reduced. Accordingly, the lubrication performance inside of the bearing and the lubrication performance in the contact portion between the outer ring and the external gear can be respectively easily improved, and thereby, the life of the gearing can be made longer.

In the robot according to the application example, it is preferable that the counter body is provided on an inner wall surface of the first member.

With this configuration, the counter body can be integrated with the first member. Accordingly, the number of parts can be reduced and the structure can be simplified.

In the robot according to the application example, it is preferable that the first seal member is fixed to the outer ring.

With this configuration, the first seal member can be deformed with deformation of the outer ring while keeping the seal condition between the counter body and itself. Accordingly, it is only necessary to provide the first seal member only in a part of the outer ring along the circumferential direction, and the placement space of the first seal member can be made smaller. As a result, the degree of freedom of design of the peripheral structure of the first seal member can be improved.

In the robot according to the application example, it is preferable that the first seal member is fixed to the counter body.

With this configuration, the first seal member can be fixed to the counter body over the contact range with the outer ring that changes with the deformation of the outer ring, and there is an advantage that the placement of the first seal member is easier.

In the robot according to the application example, it is preferable that a second seal member is provided between an outer circumferential surface of the outer ring and an inner circumferential surface of the barrel portion.

With this configuration, the flow of the lubricant from the inner circumference side (balls side) to the outer circumference side (external gear side) of the outer ring can be further reduced.

In the robot according to the application example, it is preferable that the outer circumferential surface of the outer ring has a concave portion with the second sealing member provided therein.

With this configuration, the sealing between the outer ring and the external gear can be realized by the second seal member while the necessary contact condition between the outer ring and the external gear is kept good. Further, the concave portion is formed in the outer ring, and the mechanical strength of the external gear is not affected.

In the robot according to the application example, it is preferable that the inner circumferential surface of the barrel portion has a concave portion with the second sealing member provided therein.

With this configuration, the sealing between the outer ring and the external gear can be realized by the second seal member while the necessary contact condition between the outer ring and the external gear is kept good.

In the robot according to the application example, it is preferable that the first seal member is an elastic body.

With this configuration, the first seal member having better seal performance can be realized.

In the robot according to the application example, it is preferable that a first lubricant provided on a side of an outer circumferential surface of the barrel portion, and a second lubricant provided on a side of the inner circumferential surface of the barrel portion and having different lubrication performance from the first lubricant are provided.

With this configuration, the lubrication conditions in the respective regions inside and outside of the external gear can be easily optimized.

A gear unit according to an application example includes an internal gear, an external gear provided with external teeth partially meshing with the internal gear, having a flexible barrel portion in a tubular shape with an opening portion in an end part, and rotating about a rotation axis relative to the internal gear, a wave generator in contact with an inner circumferential surface of the external gear and moving a meshing position of the internal gear and the external gear in a circumferential direction around the rotation axis, and a counter body provided to face the end part on the opening portion side of the barrel portion, wherein the wave generator includes a cam having a non-circular outer circumferential surface, and a bearing provided between the inner circumferential surface of the external gear and the outer circumferential surface of the cam in contact with these surfaces and including an inner ring, an outer ring, and a plurality of balls, and a first seal member is provided between the outer ring and the counter body.

According to the gear unit, the first seal member is provided between the outer ring and the counter body, and thereby, a flow of a lubricant from the inner circumference side (balls side) to the outer circumference side (external gear side) of the outer ring can be reduced. Accordingly, the lubrication performance inside of the bearing and the lubrication performance in the contact portion between the outer ring and the external gear can be respectively easily improved, and thereby, the life of the gear unit can be made longer.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a robot and a gear unit according to the invention will be explained in detail based on embodiments shown in the accompanying drawings.

1. Robot

First, an embodiment of a robot according to the invention will be explained.

Figure 1:
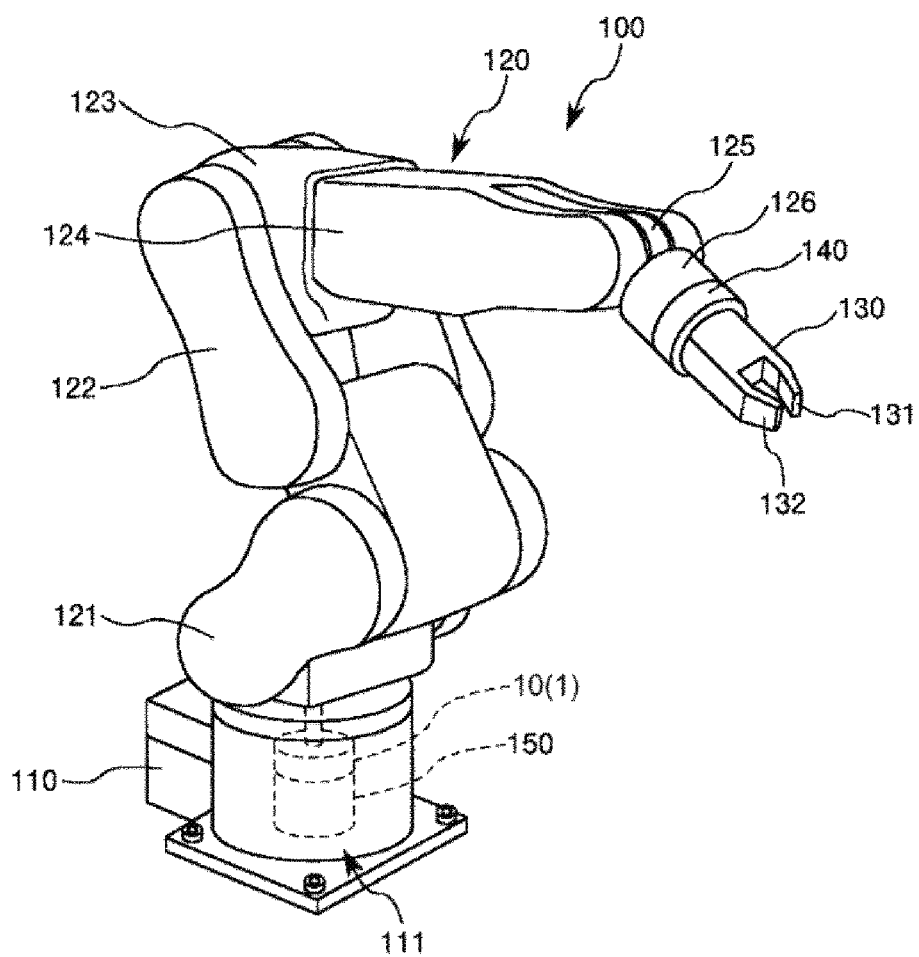
FIG. 1 shows a schematic configuration of an embodiment of a robot according to the invention.

FIG. 1 shows a schematic configuration of the embodiment of the robot according to the invention.

A robot 100 shown in FIG. 1 can perform work of feeding, removing, carrying, assembly, etc. of precision apparatuses and components forming the apparatuses (objects).

The robot 100 is a six-axis vertical articulated robot and has a base 111, a robot arm 120 connected to the base 111, and a force detector 140 and a hand 130 provided in the distal end part of the robot arm 120. Further, the robot 100 has a control apparatus 110 that controls a plurality of drive sources (including a motor 150 and a gearing 1) that generate power for driving the robot arm 120.

The base 111 is a part for attaching the robot 100 to an arbitrary installation location. The installation location of the base 111 is not particularly limited to, but includes, for example, a floor, wall, ceiling, movable platform.

The robot arm 120 includes a first arm 121 (arm), a second arm 122 (arm), a third arm 123 (arm), a fourth arm 124 (arm), a fifth arm 125 (arm), and a sixth arm 126 (arm), and the arms are sequentially coupled from the proximal end side toward the distal end side in this order. The first arm 121 is connected to the base 111. The hand 130 (end effector) for grasping e.g. various components or the like is detachably attached to the distal end of the sixth arm 126. The hand 130 has two fingers 131, 132 and may grasp e.g. various components or the like with the fingers 131, 132.

In the base 111, the drive source that drives the first arm 121 is provided. The drive source has the motor 150 such as a servo motor and a gear unit 10 including the gearing 1 (reducer) that reduces the drive power from the motor 150. Further, the plurality of drive sources having motors and reducers (not shown) are respectively provided in the respective arms 121 to 126. The individual drive sources are controlled by the control apparatus 110.

In the robot 100, the gearing 1 transmits drive power from one side to the other side of the base 111 (first member) and the first arm 121 (second member). More specifically, the gearing 1 transmits drive power for rotating the first arm 121 with respect to the base 111 from the base 111 side toward the first arm 121 side. Here, the gearing 1 functions as a reducer, and thereby, can reduce the drive power and rotate the first arm 121 with respect to the base 111. Note that "rotation" includes movement in both directions including one direction and the opposite direction with respect to a certain center point and rotation with respect to the certain center point.

As described above, the robot 100 includes the base 111 as "first member", the first arm 121 rotatably provided with respect to the base 111 as "second member", and the gear unit 10 including the gearing 1 that transmits drive power from one side to the other side of the base 111 (first member) and the first arm 121 (second member). Note that an arbitrary number of arms selected among the second to sixth arms 122 to 126 sequentially from the first arm 121 side may be regarded as "second member". That is, a structure including the first arm 121 and the arbitrary number of arms selected among the second to sixth arms 122 to 126 sequentially from the first arm 121 side may be regarded as "second member". For example, a structure including the first, second arms 121, 122 may be regarded as "second member", or the whole robot arm 120 may be regarded as "second member". Alternatively, "second member" may include the hand 130. That is, the structure including the robot arm 120 and the hand 130 may be regarded as "second member".

The above described robot 100 includes the gear unit 10, which will be described later, for giving the gearing 1 a longer life.

2. Gear Unit

As below, embodiments of the gear unit according to the invention will be explained.

First Embodiment

Figure 2:
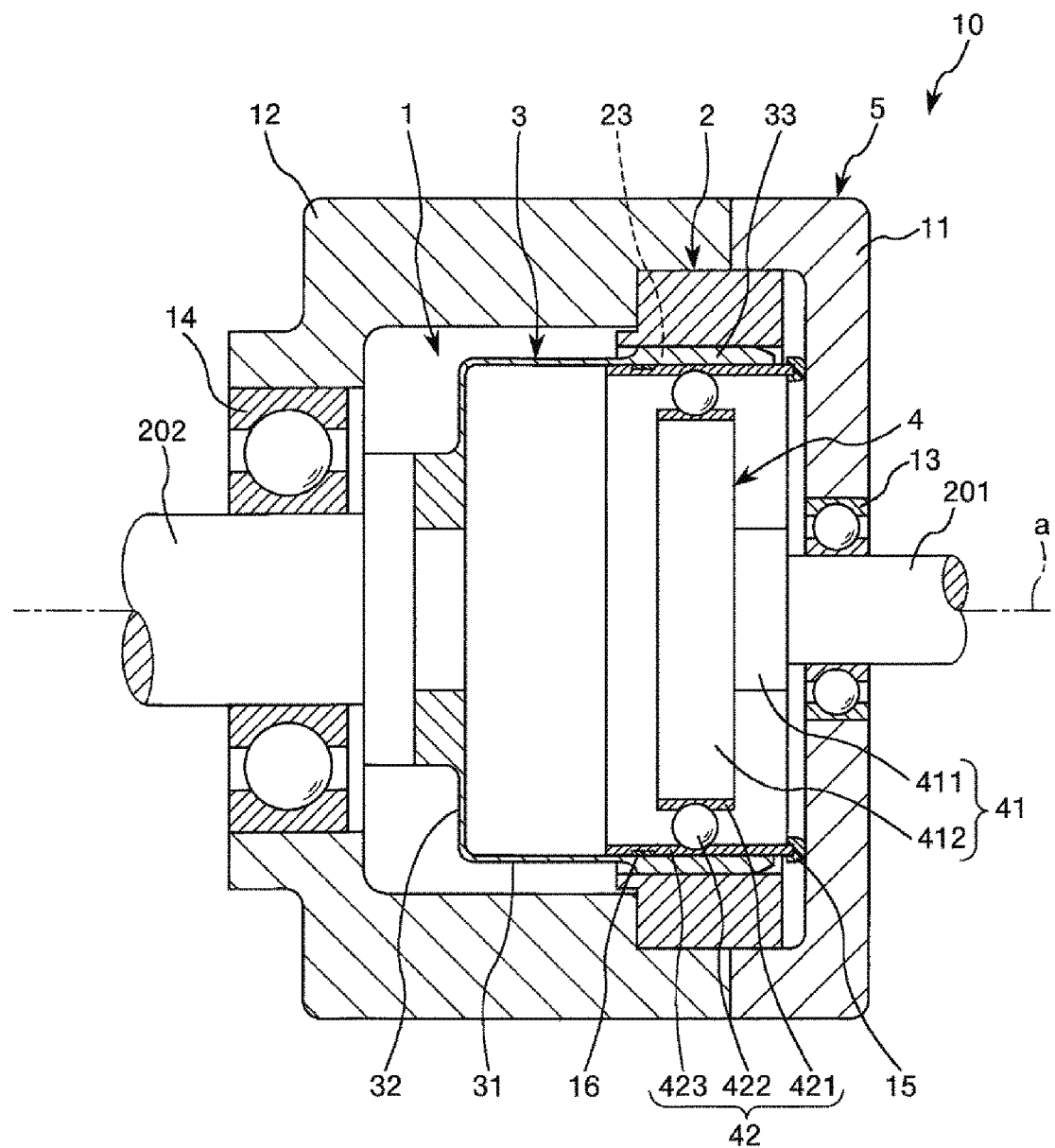
FIG. 2 is a longitudinal sectional view showing a gear unit according to a first embodiment of the invention.
Figure 3:
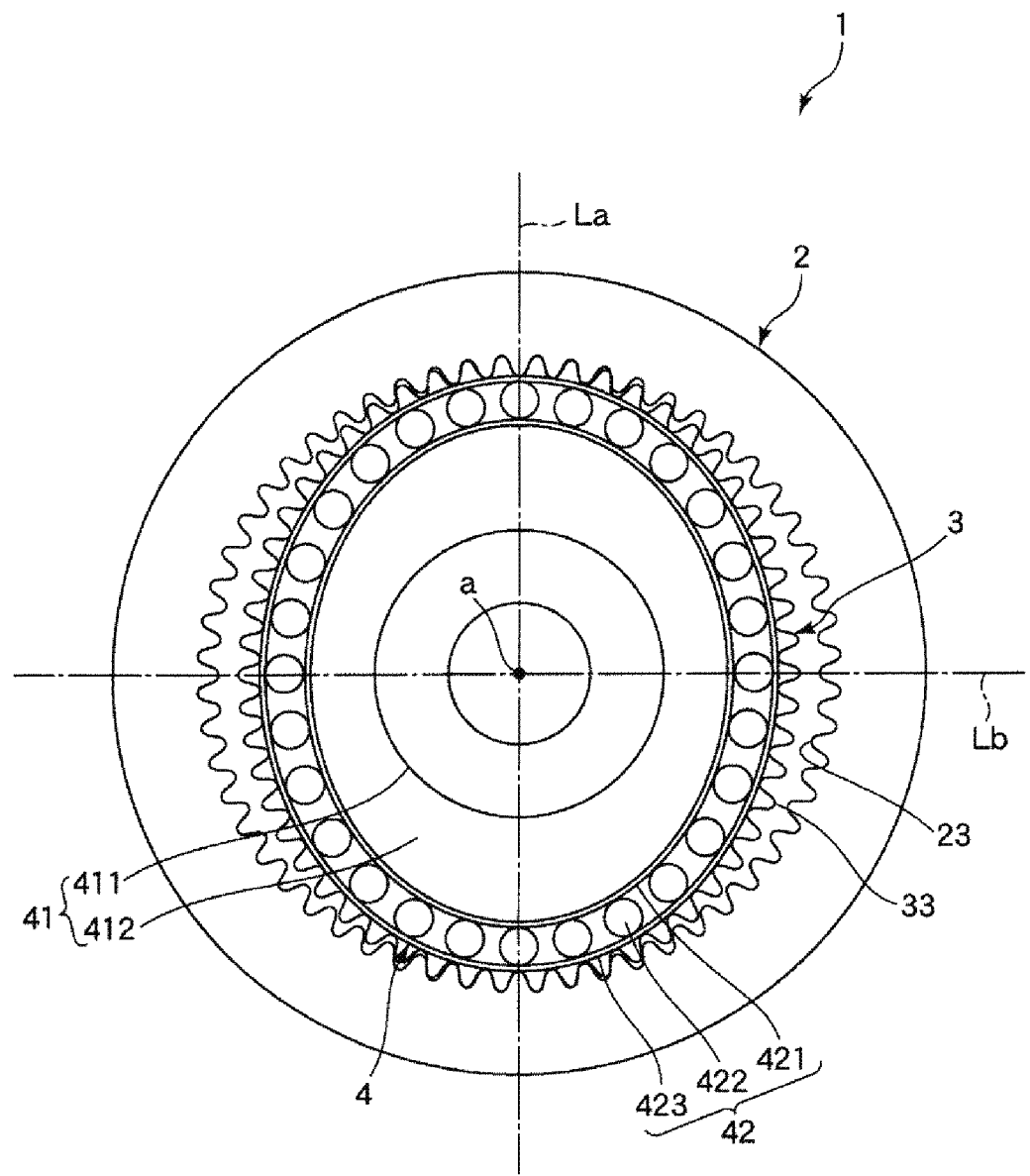
FIG. 3 is a front view of a gearing of the gear unit shown in FIG. 2.
Figure 4:
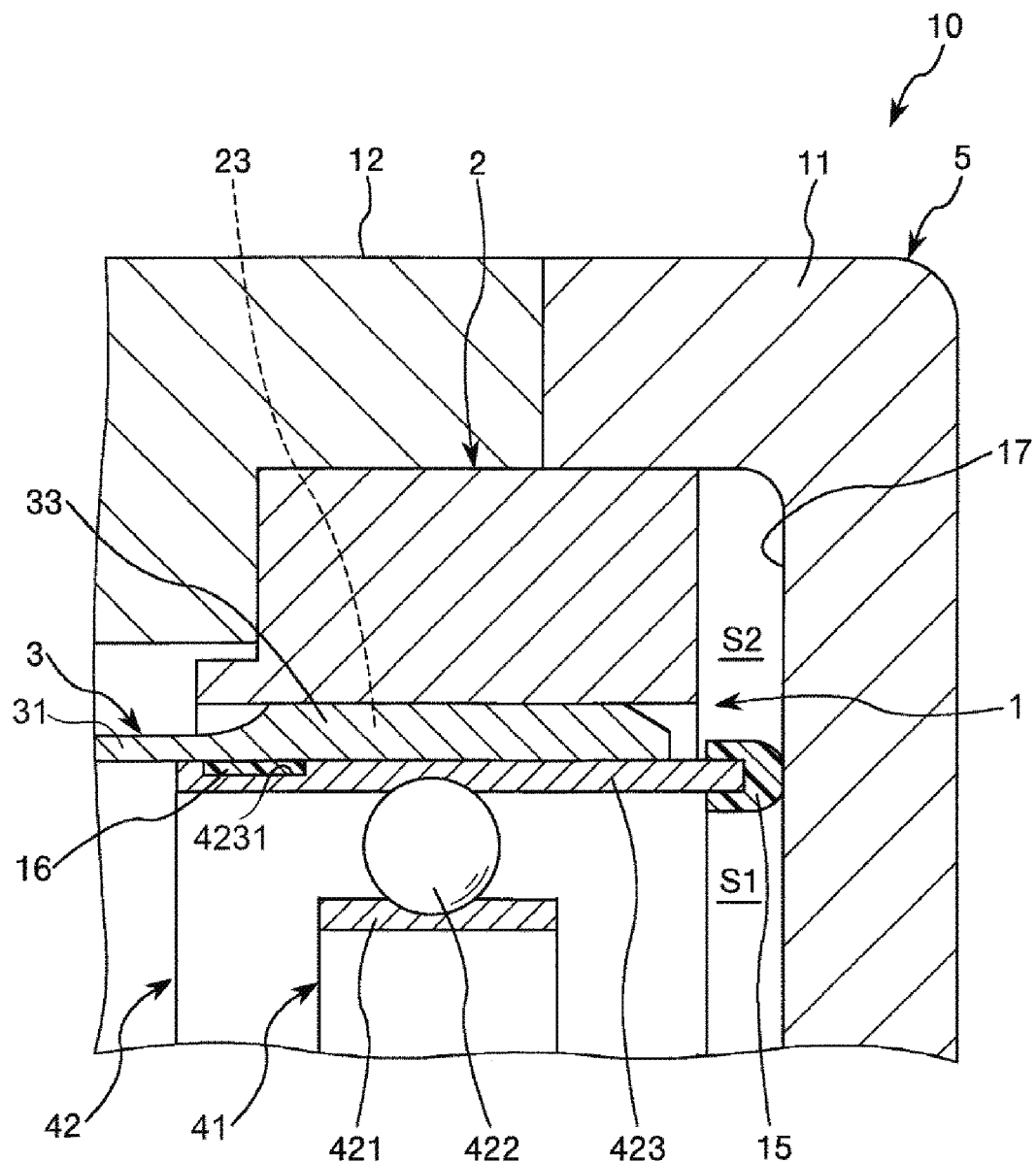
FIG. 4 is a partially enlarged longitudinal sectional view for explanation of first, second seal members of the gear unit shown in FIG. 2.
Figure 5:
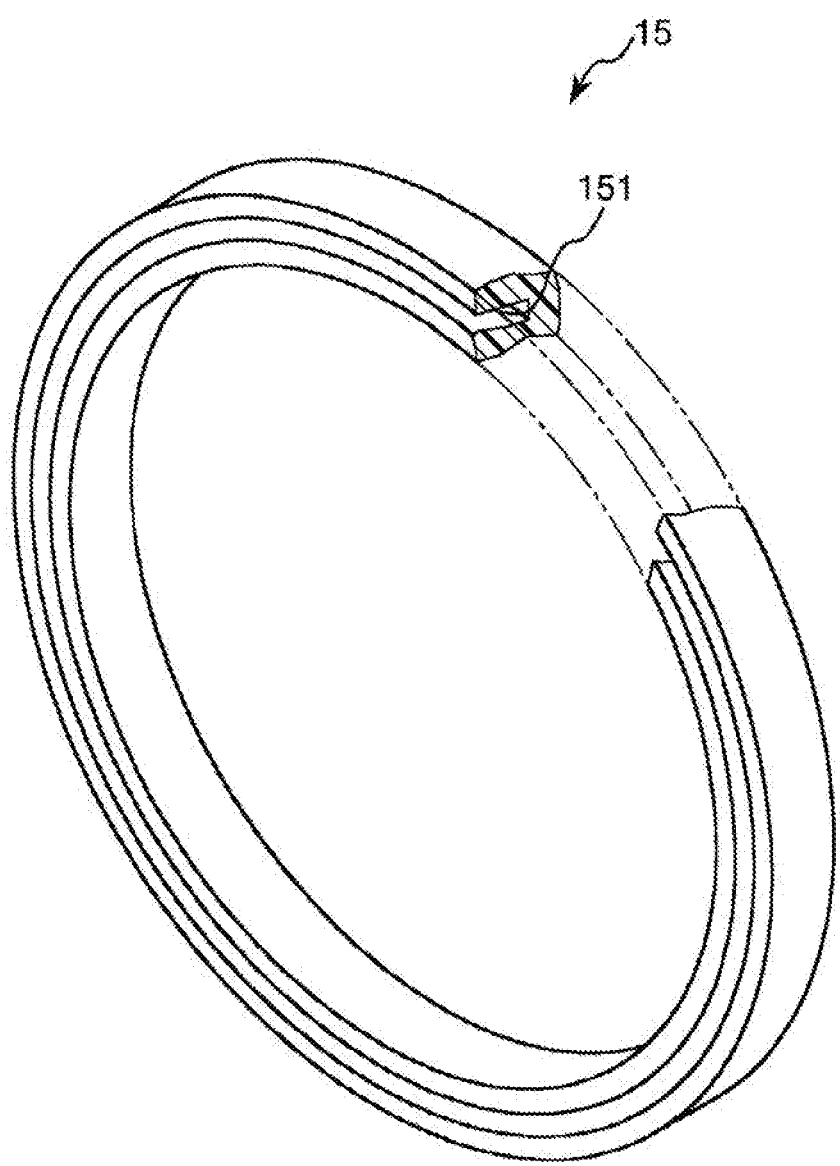
FIG. 5 is a perspective view of the first seal member shown in FIG. 4.
Figure 6:
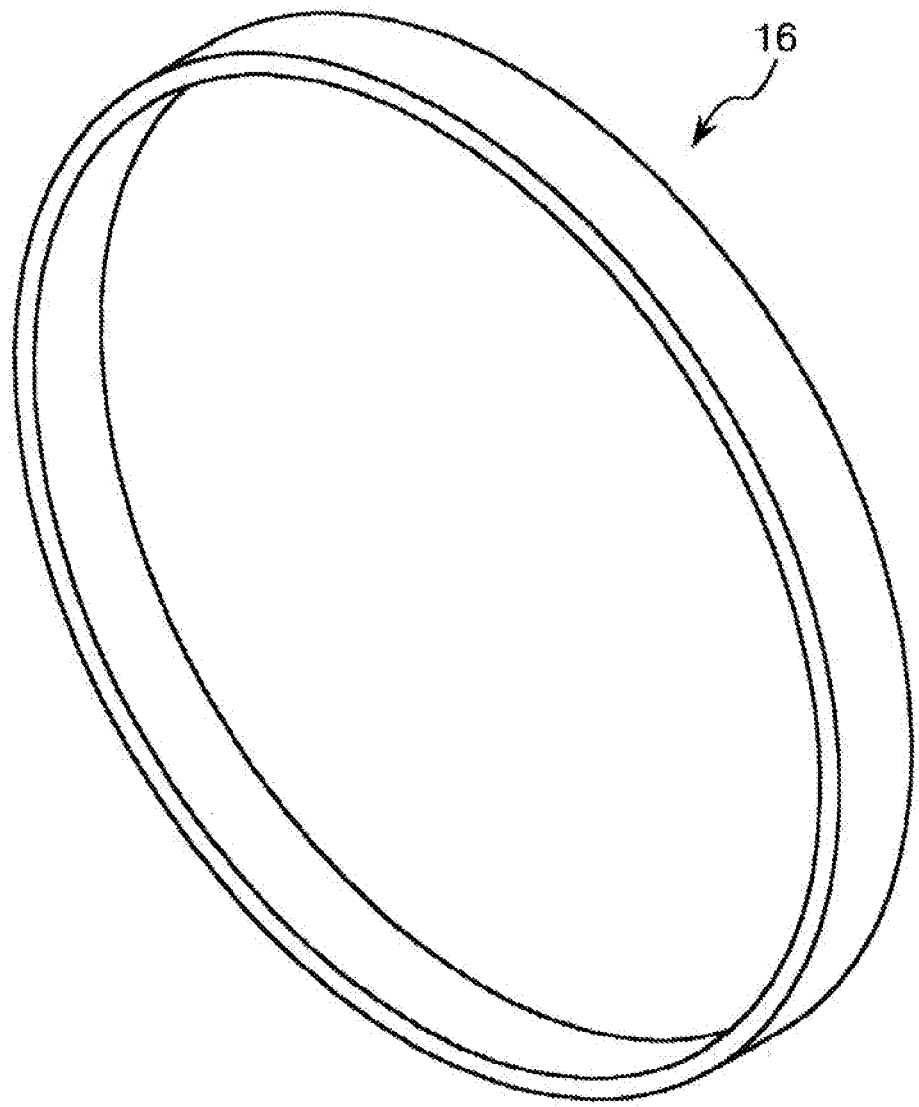
FIG. 6 is a perspective view of the second seal member shown in FIG. 4.

FIG. 2 is a longitudinal sectional view showing a gear unit according to the first embodiment of the invention. FIG. 3 is a front view of a gearing of the gear unit shown in FIG. 2. FIG. 4 is a partially enlarged longitudinal sectional view for explanation of first, second seal members of the gear unit shown in FIG. 2. FIG. 5 is a perspective view of the first seal member shown in FIG. 4. FIG. 6 is a perspective view of the second seal member shown in FIG. 4. Note that, in the respective drawings, for convenience of explanation, the dimensions of the respective parts are shown with appropriate exaggeration as necessary and the dimension ratios between the respective parts are not necessarily the same as the actual dimension ratios. In FIG. 3, for convenience of explanation, first, second seal members 15, 16, which will be described later, are omitted. Note that "seal" means filling a gap, seam, or the like for reducing entrance and movement of a lubricant and foreign matter and obtaining airtightness and is also referred to as "sealing", and "seal member" is a member used therefor.

The gear unit 10 shown in FIG. 2 has the gearing 1 and a housing 5 housing the gearing 1.

Gearing

The gearing 1 is a strain wave gearing and used as e.g. a reducer. The gearing 1 has a rigid gear 2 as an internal gear, a flexible gear 3 as a cup-shaped external gear provided inside of the rigid gear 2, a wave generator 4 provided inside of the flexible gear 3, and the first seal member 15 and the second seal member 16 attached to the wave generator 4.

In the gearing 1, the cross-sectional surface of the flexible gear 3 has a portion deformed into an elliptical shape or oval shape by the wave generator 4, and the flexible gear 3 meshes with the rigid gear 2 in both end parts on the long axis side of the portion. The numbers of teeth of the rigid gear 2 and the flexible gear 3 differ from each other.

In the gearing 1, for example, when the drive power (e.g. the drive power from the above described motor 150) is input to the wave generator 4, the rigid gear 2 and the flexible gear 3 relatively rotate about an axis line a due to the difference in number of teeth while the meshing position with each other moves in the circumferential direction. Thereby, the drive force input from the drive source to the wave generator 4 can be reduced and output from the flexible gear 3. That is, a reducer with the wave generator 4 on the input shaft side and the flexible gear 3 on the output shaft side can be realized.

As shown in FIGS. 2 and 3, the rigid gear 2 is a ring-shaped internal gear formed by a rigid body that does not substantially flex in the radial direction and having internal teeth 23. In the embodiment, the rigid gear 2 is a spur gear. That is, the internal teeth 23 have tooth traces parallel to the axis line a. Note that the tooth traces of the internal teeth 23 may be inclined with respect to the axis line a. Therefore, the rigid gear 2 may be a helical gear or double-helical gear.

The flexible gear 3 is inserted into the rigid gear 2. The flexible gear 3 is an external gear having flexibility flexibly deformable in the radial direction and having external teeth 33 that mesh with the internal teeth 23 of the rigid gear 2. The number of teeth of the flexible gear 3 is smaller than the number of teeth of the rigid gear 2. The numbers of teeth of the flexible gear 3 and the rigid gear 2 are different from each other, and thereby, a reducer can be realized.

In the embodiment, the flexible gear 3 has a cup shape with an open end (the end portion on the right in FIG. 2) in the axis line a direction and the external teeth 33 are formed in the end part on the opening side. Here, the flexible gear 3 has a tubular (more specifically, cylindrical) barrel portion (tubular portion) around the axis line a, and a bottom portion 32 connected to the other end part side of the barrel portion 31 in the axis line a direction. Thereby, the end part of the barrel portion 31 on the opposite side to the bottom portion 32 can be easily flexed in the radial direction. Accordingly, the flexural meshing of the flexible gear 3 with the rigid gear 2 in a good condition can be realized. Further, the rigidity of the end part of the barrel portion 31 on the bottom portion 32 side can be improved. Therefore, a shaft 202 (e.g. output shaft) is connected to the bottom portion 32.

In the space on the outer circumferential surface side and the space on the inner circumferential surface side of the barrel portion 31 of the flexible gear 3, lubricants (not shown) are respectively provided. The lubricant provided in the space on the outer circumferential surface side of the barrel portion 31 is respectively used for lubrication in the meshing portion between the rigid gear 2 and the flexible gear 3 and lubrication in the contact portion between the flexible gear 3 and the wave generator 4. Further, the lubricant provided in the space on the inner circumferential surface side of the barrel portion 31 is used for lubrication inside of a bearing 42 of the wave generator 4, which will be described later. Note that, hereinafter, the meshing portion between the rigid gear 2 and the flexible gear 3, the contact portion between the flexible gear 3 and the wave generator 4, and the inside of the bearing 42 are respectively referred to as objects to be lubricated.

As the lubricant, any of lubricant oil, grease, and solid lubricant may be employed. The grease contains a base oil and a thickener. The thickener includes e.g. soap such as calcium soap, calcium complex soap, sodium soap, aluminum soap, lithium soap, or lithium complex soap or non-soap such as polyurea, sodium terephthalate, polytetrafluoroethylene (PTFE), organic bentonite, silica gel, or the like, and one of them may be used singly or a combination of two or more of them may be used. Further, the base oil includes e.g. mineral oils (purified mineral oils) of paraffine base, naphthene base, or the like and synthetic oils such as polyolefin, ester, or silicone, and one of them may be used singly or a combination of two or more of them may be used.

Further, it is preferable that the grease contains an additive such as an antioxidant, extreme-pressure agent, or rust-preventive agent, a solid lubricant such as graphite, molybdenum sulfide, or polytetrafluoroethylene (PTFE), etc. and more preferable that the grease contains an extreme-pressure agent. Thereby, even when the objects to be lubricated are extreme-pressure lubricated, seizure and scuffing may be effectively prevented. Particularly, it is preferable to use organic molybdenum compound or zinc dialkyldithiophosphate as the extreme-pressure agent. The grease contains the organic molybdenum compound, and thereby, friction in the objects to be lubricated be effectively reduced. Particularly, organic molybdenum has an extreme-pressure property and wear resistance equal to molybdenum disulfide, and further, is better in oxidation stability than molybdenum disulfide. Accordingly, a longer life can be given to the grease.

Here, the amount of rotation of the flexible gear 3 is largely different from the amount of rotation of the wave generator 4 (specifically, a cam 41, which will be described later) according to the reduction ratio or increase ratio of the gearing 1, and accordingly, sliding speeds and pressure in the meshing portion between the rigid gear 2 and the flexible gear 3 and the contact portion between the flexible gear 3 and the wave generator 4 are largely different from the sliding speed and pressure inside of the bearing 42 of the wave generator 4 to be described later.

Therefore, it is preferable that the lubrication performance is different between the lubricants used in the space on the outer circumferential surface side and the space on the inner circumferential surface side of the barrel portion 31. That is, it is preferable that the robot 100 or the gear unit 10 includes a first lubricant provided on the outer circumferential surface side of the barrel portion 31 and a second lubricant provided on the inner circumferential surface side of the barrel portion 31 and having lubrication performance different from the first lubricant. Thereby, the lubrication conditions in the respective regions inside and outside of the flexible gear 3 can be easily optimized. Here, in the gear unit 10, even when the two lubricants different in lubrication performance are used, as will be described later, the first, second seal members 15, 16 are provided, and thereby, mixing of these lubricants can be reduced.

The first lubricant is supplied to the meshing portion between the rigid gear 2 and the flexible gear 3 and the contact portion between the flexible gear 3 and the wave generator 4 with flexural deformation of the flexible gear 3 in the radial direction (opening and closing motion of the opening portion of the flexible gear 3). Accordingly, as the first lubricant, grease with better load bearing and wear resistance, e.g., grease containing an extreme additive such as molybdenum is preferably used and grease with higher penetration (softer) and higher oil separation is preferably used for easily flowing into gaps.

As the second lubricant, grease accommodating high-speed rotation is preferably used, and e.g. channeling-type grease with lower penetration (harder) and grease for high-speed rotation having a large rate index (dmN value) containing an additive having an effect of suppressing flaking (e.g. sodium nitrite or organic molybdenum) is preferably used.

Note that, depending on the properties of the lubricants, the same lubricant may be used in the above described space on the outer circumferential surface side and space on the inner circumferential surface side of the flexible gear 3. Also, in this case, the lubricants provided in these spaces show changes in property or characteristic different by the above described different sliding speeds and pressure, and the reduction of mixing of these lubricants contributes to the longer life of the gearing 1.

The wave generator 4 is provided inside of the flexible gear 3 and rotatable about an axis line a. Further, as shown in FIG. 3, the wave generator 4 deforms the cross-sectional surface of the opening portion (the portion opposite to the bottom portion 32) of the flexible gear 3 into an elliptical shape or oval shape having a long axis La and a short axis Lb and allows the external teeth 33 to mesh with the internal teeth 23 of the rigid gear 2. Here, the flexible gear 3 and the rigid gear 2 mesh with each other rotatably about the same axis line a internally and externally.

In the embodiment, the wave generator 4 has the cam 41 and the bearing 42 attached to the outer circumference of the cam 41. The cam 41 has a shaft portion 411 rotating about the axis line a and a cam portion 412 projecting outward from one end part of the axis portion 411. Here, a shaft 201 (e.g. input shaft) is connected to the shaft portion 411. The outer circumferential surface of the cam portion 412 has an elliptical shape or oval shape as seen from the direction along the axis line a. The bearing 42 has a flexible inner ring 421 and outer ring 423 and a plurality of balls 422 provided between the rings. Here, the inner ring 421 is fitted with the outer circumferential surface of the cam portion 412 of the cam 41 and elastically deforms into an elliptical shape or oval shape along the outer circumferential surface of the cam portion 412. With the deformation, the outer ring 423 also elastically deforms into an elliptical shape or oval shape. The outer circumferential surface of the inner ring 421 and the inner circumferential surface of the outer ring 423 respectively serve as orbital planes that guide and roll the plurality of balls 422 along the circumferential direction. Further, the plurality of balls 422 are held by a holder (not shown) to keep the distances between each other constant in the circumferential direction.

Particularly, as shown in FIG. 4, the outer ring 423 of the bearing 42 has a longer length along the axis line a than the inner ring 421 and has a part projecting outward (to the right side in FIG. 4) from the opening portion of the flexible gear 3. Further, the first seal member 15 is attached to the part. The first seal member 15 is in contact with both the outer ring 423 and the housing 5 (inner wall surface 17) in between. Thereby, the movement of the lubricant between inside and outside of the flexible gear 3 through between the outer ring 423 and the housing 5 (between a space S1 and a space S2 shown in FIG. 4) can be reduced.

As shown in FIG. 5, the first seal member 15 has an annular shape and a concave portion 151 along the circumferential direction is formed on one side surface thereof. A part of the outer ring 423 is inserted into the concave portion 151. Thereby, the first seal member 15 can be fixedly attached to the outer ring 423 by the simple configuration. Further, even when the outer ring 423 flexurally deforms in the radial direction, the first seal member 15 can be deformed with the deformation. Here, the first seal member 15 deforms while sliding with respect to the housing 5 to maintain the condition in contact with both the outer ring 423 and the housing 5.

The constituent material of the first seal member 15 is not particularly limited as long as the above described sealing can be realized. It is preferable to use an elastic material such as a resin material, rubber material, or elastomer material. That is, it is preferable that the first seal member 15 is an elastic member. Thereby, the first seal member 15 having better seal performance can be realized.

Further, as shown in FIG. 4, the second seal member 16 is attached to the outer circumferential surface of the outer ring 423. On the outer circumferential surface of the outer ring 423 of the embodiment, a concave portion 4231 (concave groove) is provided along the circumferential direction. The second seal member 16 is provided within the concave portion 4231. The second seal member 16 is in contact with both the outer ring 423 and the flexible gear 3 in between. Thereby, the movement of the lubricant between inside and outside of the flexible gear 3 through between the outer ring 423 and the flexible gear 3 can be reduced. The second seal member 16 is provided within the concave portion 4231, and thereby, there is an advantage that sealing by the second seal member 16 can be realized while the necessary contact condition between the outer ring 423 and the flexible gear 3 is held. In the embodiment, the outer ring 423 of the bearing 42 has a part projecting toward the inner side (toward the bottom portion 32 side) of the flexible gear 3 than the inner ring 421 and the concave portion 4231 is provided in the part. Thereby, the above described advantage by the second seal member 16 provided within the concave portion 4231 is significantly offered.

As shown in FIG. 6, the second seal member 16 has an annular shape (endless belt shape). The constituent material of the second seal member 16 is not particularly limited as long as the above described sealing can be realized. The same material as the constituent material of the above described first seal member 15 may be used. It is preferable to use an elastic material such as a resin material, rubber material, or elastomer material. That is, it is preferable that the second seal member 16 is an elastic member. Thereby, the second seal member 16 having better seal performance can be realized.

In the wave generator 4, the direction of the cam portion 412 changes with the rotation of the cam 41 about the axis line a, and accordingly, the outer circumferential surface of the outer ring 423 also deforms and the meshing positions of the rigid gear 2 and the flexible gear 3 with each other is moved in the circumferential direction.

It is preferable that the rigid gear 2, the flexible gear 3, and the wave generator 4 are respectively formed using metal materials. Particularly, it is preferable to use ferrous materials because mechanical characteristics and workability are better and the cost is relatively low. The ferrous materials are not particularly limited, but are preferably one of e.g. cast iron, nickel-chromium-molybdenum steel, chromium-molybdenum steel (SCM), maraging steel, and precipitation-hardened stainless steel. Note that the rigid gear 2 and the wave generator 4 are respectively substantially rigid bodies, and can be formed using a ceramics material or the like. However, the metal materials are preferably used because of balance in strength with the flexible gear 3. If the difference in strength between these members is too large, the member with the lower strength is extremely easily worn and, as a result, the life of the gearing 1 becomes shorter.

Housing

The housing 5 shown in FIG. 2 has a lid body 11 in a nearly plate shape that supports the shaft 201 (e.g. input shaft) via a bearing 13 and a main body 12 in a cup shape that supports a shaft 202 (e.g. output shaft) via a bearing 14, and the above described gearing 1 is housed between the bodies. Here, the rigid gear 2 of the above described gearing 1 is fixed to at least one of the lid body 11 and the main body 12 by e.g. screws or the like.

The lid body 11 of the housing 5 has a plate shape spreading in a direction perpendicular to the axis line a to cover the opening portion of the flexible gear 3. Further, the lid body 11 has the inner wall surface 17 in contact with the above described first seal member 15. The inner wall surface 17 is a slide surface on which the above described first seal member 15 slides with the deformation thereof. The housing 5 is formed using e.g. a metal material and provided on the inner wall surface of the base 111 of the above described robot 100. Here, the lid body 11 may be formed separately from or integrally with the base 111.

As described above, the gear unit 10 of the robot 100 has the rigid gear 2 as the internal gear, the flexible gear 3 as the external gear, the wave generator 4, and the lid body 11 as a counter body.

Here, the flexible gear 3 is provided with external teeth 33 that partially mesh with the rigid gear 2, has the flexible barrel portion 31 in a tubular shape including an opening portion in the end part, and rotates about the axis line a (rotation axis) relative to the rigid gear 2.

The wave generator 4 is in contact with the inner circumferential surface of the flexible gear 3 and moves the meshing position of the rigid gear 2 and the flexible gear 3 in the circumferential direction about the axis line a. Further, the wave generator 4 has the cam 41 having the outer circumferential surface in a non-circular shape, and the bearing 42 provided between the inner circumferential surface of the flexible gear 3 and the outer circumferential surface of the cam 41 in contact with the surfaces. The bearing 42 includes the inner ring 421, the outer ring 423, and the plurality of balls 422.

The lid body 11 (counter body) is provided to face the end part on the opening portion side (on the right sides in FIGS. 2 and 4) of the barrel portion 31. The first seal member 15 is provided between the outer ring 423 and the lid body 11. As described above, the first seal member 15 is provided between the outer ring 423 and the lid body 11, and thereby, the flow of the lubricant from the inner circumference side (balls 422 side) to the outer circumference side (flexible gear 3 side) of the outer ring 423 can be reduced. Accordingly, the lubrication performance inside the bearing 42 and the lubrication performance in the contact portion between the outer ring 423 and the flexible gear 3 can be respectively easily improved, and thereby, the life of the gear unit 10 (gearing 1) can be made longer.

In the robot 100 or gear unit 10, it is preferable that the lid body 11 (counter body) is provided on the inner wall surface of the base 111 (first member). Thereby, the lid body 11 can be integrated with the base 111. Accordingly, the number of parts can be reduced and the structure can be simplified.

In the embodiment, the first seal member 15 is fixed to the outer ring 423. Thereby, the first seal member 15 can be deformed with the deformation of the outer ring 423 while keeping the seal condition between the lid body 11 and itself. Accordingly, it is only necessary to provide the first seal member 15 only in a part of the outer ring 423 along the circumferential direction, and the placement space of the first seal member 15 can be made smaller. As a result, the degree of freedom of design of the peripheral structure of the first seal member 15 can be improved.

Further, the second seal member 16 is provided between the outer circumferential surface of the outer ring 423 and the inner circumferential surface of the barrel portion 31 of the flexible gear 3. Thereby, the flow of the lubricant from the inner circumference side (balls 422 side) to the outer circumference side (flexible gear 3 side) of the outer ring 423 can be further reduced.

In the embodiment, the outer circumferential surface of the outer ring 423 has the concave portion 4231 with the second seal member 16 provided therein. Thereby, the sealing between the outer ring 423 and the flexible gear 3 can be realized by the second seal member 16 while the necessary contact condition between the outer ring 423 and the flexible gear 3 is kept good. Further, the concave portion 4231 is formed in the outer ring 423, and the mechanical strength of the flexible gear 3 is not affected.

Second Embodiment

Next, the second embodiment of the invention will be explained.

Figure 7:
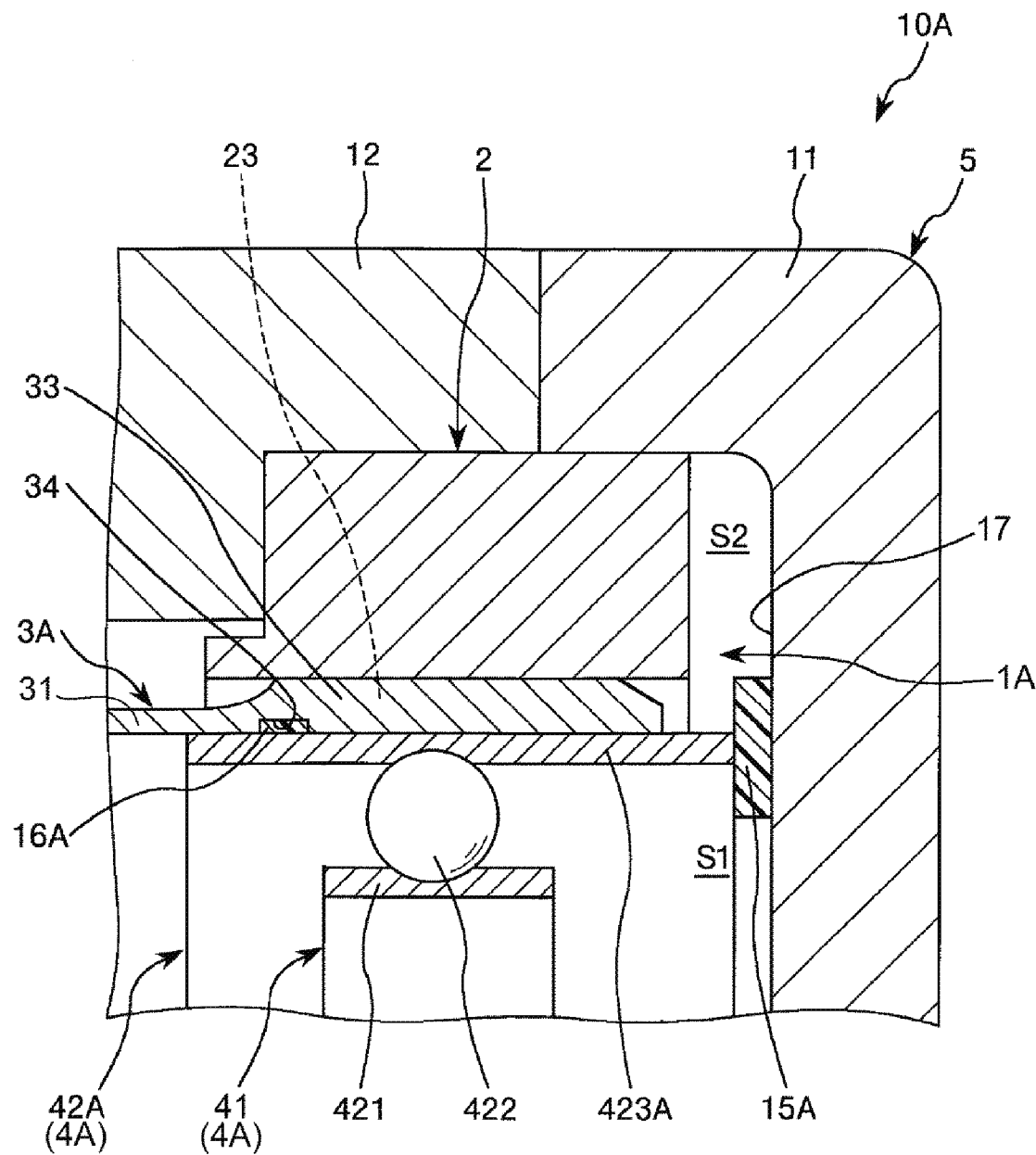
FIG. 7 is a partially enlarged longitudinal sectional view for explanation of first, second seal members of a gear unit according to a second embodiment of the invention.

FIG. 7 is a partially enlarged longitudinal sectional view for explanation of first, second seal members of a gear unit according to the second embodiment of the invention.

The embodiment is the same as the above described first embodiment except that the configurations of the first seal member and the second seal member are different. Note that, in the following description, the embodiment will be explained with a focus on the differences from the above described embodiment and the explanation of the same items will be omitted. Further, in FIG. 7, the same configurations as those of the above described embodiment have the same signs.

A gear unit 10A shown in FIG. 7 has a gearing 1A and the housing 5 housing the gearing 1A. The gearing 1A has the rigid gear 2 as the internal gear, a flexible gear 3A as an external gear provided inside of the rigid gear 2, a wave generator 4A provided inside of the flexible gear 3A, a first seal member 15A attached to the housing 5, and a second seal member 16A attached to the flexible gear 3A. Here, the wave generator 4A includes the cam 41 and a bearing 42A provided on the outer circumferential surface of the cam 41 and having the inner ring 421, an outer ring 423A, and the plurality of balls 422.

The first seal member 15A is fixed to the inner wall surface 17 of the lid body 11 of the housing 5 using an adhesive or the like. The first seal member 15A is in contact with both the outer ring 423A and the housing 5 in between. Thereby, the movement of the lubricant between inside and outside of the flexible gear 3A through between the outer ring 423A and the housing 5 (between a space S1 and a space S2 shown in FIG. 7) can be reduced.

As described above, the first seal member 15A is fixed to the lid body 11 as the counter body. Thereby, the first seal member 15A can be fixed to the lid body 11 over the contact range with the outer ring 423A that changes with the deformation of the outer ring 423A, and there is an advantage that the placement of the first seal member 15A is easier. Here, the outer ring 423A deforms while sliding with respect to the surface of the first seal member 15A to maintain the contact condition with the first seal member 15A. Note that, in the drawings, the first seal member 15A has an annular shape, however, the shape is not limited to that as long as the member can be provided over the contact range with the outer ring 423A. For example, the shape may be a plate shape or sheet shape.

Further, a concave portion 34 (concave groove) is provided along the circumferential direction on the inner circumferential surface of the flexible gear 3A of the embodiment. The second seal member 16A is provided within the concave portion 34. The second seal member 16A is in contact with both the outer ring 423A and the flexible gear 3A in between. Thereby, the movement of the lubricant between inside and outside of the flexible gear 3A through between the outer ring 423A and the flexible gear 3A can be reduced. The second seal member 16A is provided within the concave portion 34, and thereby, there is an advantage that sealing by the second seal member 16A can be realized while the necessary contact condition between the outer ring 423A and the flexible gear 3 is held. In the embodiment, the outer ring 423A of the bearing 42A has a part projecting toward the inner side of the flexible gear 3A than the inner ring 421 and the concave portion 34 is provided in a part facing the part of the flexible gear 3A. Thereby, the above described advantage by the second seal member 16A provided within the concave portion 34 is significantly offered.

As described above, the second seal member 16A is provided between the outer circumferential surface of the outer ring 423A and the inner circumferential surface of the barrel portion 31 of the flexible gear 3A. Thereby, the flow of the lubricant from the inner circumference side (balls 422 side) to the outer circumference side (flexible gear 3A side) of the outer ring 423A can be further reduced.

Further, the inner circumferential surface of the barrel portion 31 has the concave portion 34 with the second seal member 16A provided therein. Thereby, the sealing between the outer ring 423A and the flexible gear 3A can be realized by the second seal member 16A while the necessary contact condition between the outer ring 423A and the flexible gear 3A is kept good.

According to the above described second embodiment, the life of the gearing 1A or gear unit 10A can be made longer.

Third Embodiment

Next, the third embodiment of the invention will be explained.

Figure 8:
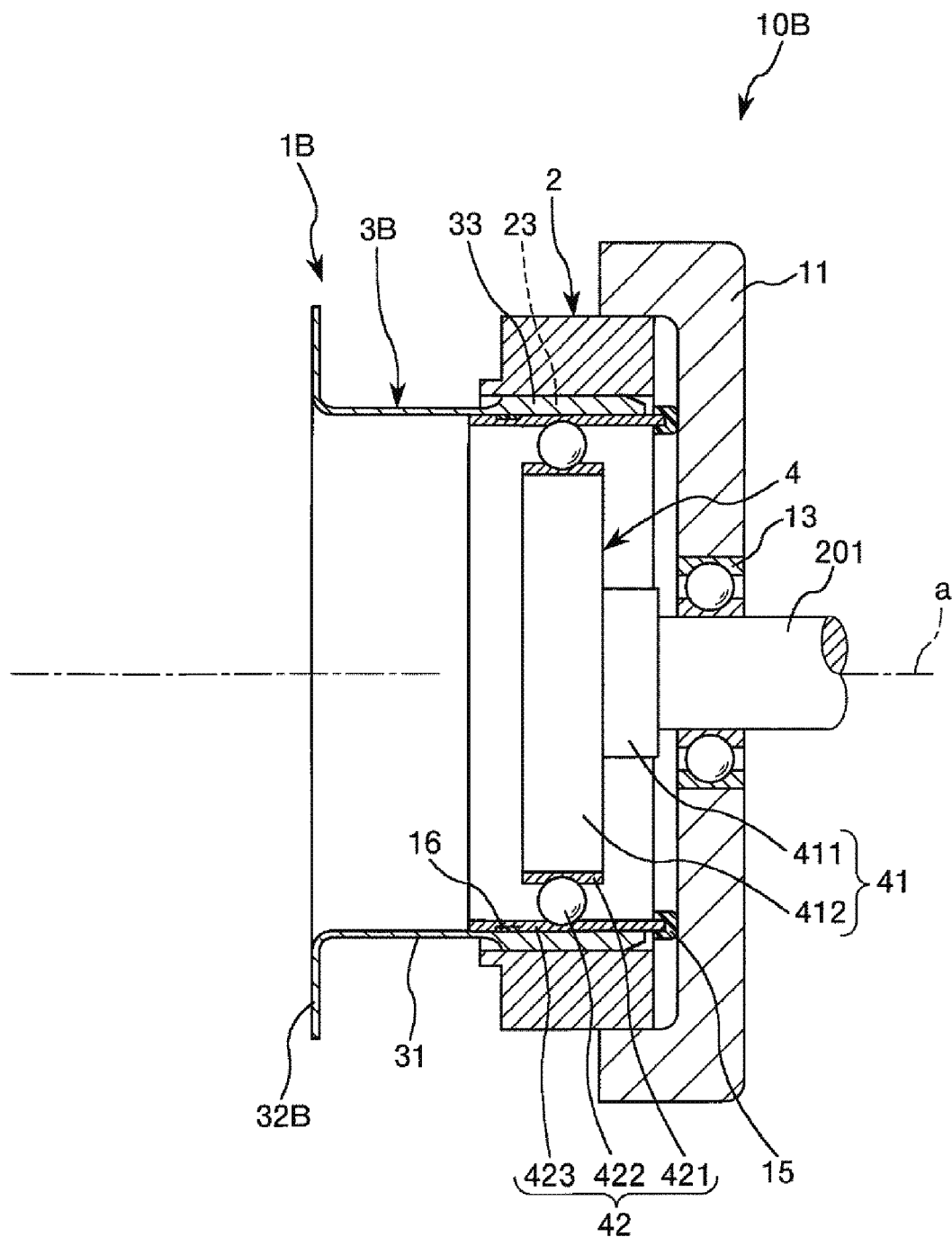
FIG. 8 is a longitudinal sectional view showing a gear unit according to a third embodiment of the invention.

FIG. 8 is a longitudinal sectional view showing a gear unit according to the third embodiment of the invention.

The embodiment is the same as the above described first embodiment except that the configuration of the external gear is different. Note that, in the following description, the embodiment will be explained with a focus on the differences from the above described embodiment and the explanation of the same items will be omitted. Further, in FIG. 8, the same configurations as those of the above described embodiment have the same signs.

A gear unit 10B shown in FIG. 8 has a gearing 1B and the lid body 11. The gearing 1B has a flexible gear 3B as a hat-shaped external gear provided inside of the rigid gear 2. The flexible gear 3B has a flange portion 32B (connecting portion) connected to one end part of the tubular barrel portion 31 and projecting toward the opposite side to the axis line a. An output shaft (not shown) is attached to the flange portion 32B.

To the gearing 1B, the first, second seal members 15, 16 are attached like the gearing 1 of the above described first embodiment.

According to the above described third embodiment, the life of the gearing 1B or gear unit 10Bw can be made longer.

As above, the robot and gear unit according to the invention are explained with reference to the illustrated embodiments, however, the invention is not limited to those. The configurations of the individual parts may be replaced by arbitrary configurations having the same functions. Further, another arbitrary configuration may be added to the invention. Furthermore, an arbitrary step may be added to the manufacturing method of the flexible gear according to the invention.

In the above described embodiments, the gearing in which the base of the robot is "first member" and the first arm is "second member" and drive power is transmitted from the first member to the second member is explained, however, the invention is not limited to that. The invention can be applied to a gearing in which the nth (n is an integer equal to or larger than one) arm is "first member" and the (n+1)th arm is "second member" and drive power is transmitted from one of the nth arm and the (n+1)th arm to the other. Further, the invention can be applied to a gearing in which drive power is transmitted from the second member to the first member.

In the above described embodiments, the six-axis vertical articulated robot is explained, however, the invention is not limited to that as long as the robot uses a gearing having a flexible gear. For example, the number of joints of the robot is arbitrary and the invention can be applied to a horizontal articulated robot.

Further, the gear unit according to the invention may be provided in another arbitrary apparatus (having a drive power transmission unit) than the robot.

The entire disclosure of Japanese Patent Application No. 2017-067192, filed Mar. 30, 2017 is expressly incorporated by reference herein.

What is claimed is:

1. A robot comprising:
a first member;
a second member including an arm and provided rotatably with respect to the first member;
a gearing that transmits drive power from one side to the other side of the first member and the second member, wherein the gearing includes
an internal gear,
an external gear provided with external teeth partially meshing with the internal gear, having a flexible barrel portion in a tubular shape with an opening portion in an end part, and rotating about a rotation axis relative to the internal gear, and
a wave generator in contact with an inner circumferential surface of the external gear and moving a meshing position of the internal gear and the external gear in a circumferential direction around the rotation axis,
the wave generator includes
a cam having a non-circular outer circumferential surface, and
a bearing provided between the inner circumferential surface of the external gear and the outer circumferential surface of the cam in contact with these surfaces and including an inner ring, an outer ring, and a plurality of balls,
the first member includes a counter body provided to face the end part on the opening portion side of the barrel portion,
a first seal member is provided between the outer ring and the counter body, and
the first seal member is fixed to the outer ring.

2. The robot according to claim 1, wherein the counter body is provided on an inner wall surface of the first member.

3. The robot according to claim 1, wherein the first seal member is fixed to the counter body.

4. A robot comprising:
a first member;
a second member including an arm and provided rotatably with respect to the first member;
a gearing that transmits drive power from one side to the other side of the first member and the second member, wherein the gearing includes
an internal gear,
an external gear provided with external teeth partially meshing with the internal gear, having a flexible barrel portion in a tubular shape with an opening portion in an end part, and rotating about a rotation axis relative to the internal gear, and
a wave generator in contact with an inner circumferential surface of the external gear and moving a meshing position of the internal gear and the external gear in a circumferential direction around the rotation axis,
the wave generator includes
a cam having a non-circular outer circumferential surface, and
a bearing provided between the inner circumferential surface of the external gear and the outer circumferential surface of the cam in contact with these surfaces and including an inner ring, an outer ring, and a plurality of balls,
the first member includes a counter body provided to face the end part on the opening portion side of the barrel portion,
a first seal member is provided between the outer ring and the counter body, and
a second seal member is provided between an outer circumferential surface of the outer ring and an inner circumferential surface of the barrel portion.

5. The robot according to claim 4, wherein the outer circumferential surface of the outer ring has a concave portion with the second sealing member provided therein.

6. The robot according to claim 4, wherein the inner circumferential surface of the barrel portion has a concave portion with the second sealing member provided therein.

7. The robot according to claim 1, wherein the first seal member is an elastic body.

8. The robot according to claim 1, further comprising:
a first lubricant provided on a side of an outer circumferential surface of the barrel portion; and
a second lubricant provided on a side of the inner circumferential surface of the barrel portion and having different lubrication performance from the first lubricant.

9. A gear unit comprising:
an internal gear;
an external gear provided with external teeth partially meshing with the internal gear, having a flexible barrel portion in a tubular shape with an opening portion in an end part, and rotating about a rotation axis relative to the internal gear;
a wave generator in contact with an inner circumferential surface of the external gear and moving a meshing position of the internal gear and the external gear in a circumferential direction around the rotation axis; and
a counter body provided to face the end part on the opening portion side of the barrel portion,
wherein the wave generator includes
a cam having a non-circular outer circumferential surface, and
a bearing provided between the inner circumferential surface of the external gear and the outer circumferential surface of the cam in contact with these surfaces and including an inner ring, an outer ring, and a plurality of balls,
a first seal member is provided between the outer ring and the counter body, and
the first seal member is fixed to the outer ring.

10. The gear unit according to claim 9, wherein the counter body is provided on an inner wall surface of the first member.

11. The gear unit according to claim 9, wherein the first seal member is fixed to the counter body.

12. The gear unit according to claim 9, wherein a second seal member is provided between an outer circumferential surface of the outer ring and an inner circumferential surface of the barrel portion.

13. The gear unit according to claim 12, wherein the outer circumferential surface of the outer ring has a concave portion with the second sealing member provided therein.

14. The gear unit according to claim 12, wherein the inner circumferential surface of the barrel portion has a concave portion with the second sealing member provided therein.

15. The gear unit according to claim 9, wherein the first seal member is an elastic body.

16. The gear unit according to claim 9, further comprising:
- a first lubricant provided on a side of an outer circumferential surface of the barrel portion; and
- a second lubricant provided on a side of the inner circumferential surface of the barrel portion and having different lubrication performance from the first lubricant.

* * * * *